US008751137B2

(12) United States Patent
Takezoe

(10) Patent No.: US 8,751,137 B2
(45) Date of Patent: *Jun. 10, 2014

(54) APPARATUS FOR ESTIMATING EXHAUST GAS RECIRCULATION QUANTITY

(75) Inventor: Hiroyuki Takezoe, Kariya (JP)

(73) Assignee: Denso Corporation, Kariya (JP)

( * ) Notice: Subject to any disclaimer, the term of this patent is extended or adjusted under 35 U.S.C. 154(b) by 315 days.

This patent is subject to a terminal disclaimer.

(21) Appl. No.: 13/279,548

(22) Filed: Oct. 24, 2011

(65) Prior Publication Data

US 2012/0097139 A1  Apr. 26, 2012

(30) Foreign Application Priority Data

Oct. 25, 2010  (JP) ................................. 2010-239129

(51) Int. Cl.
*F02M 25/07* (2006.01)
*F02B 47/08* (2006.01)
*F02D 41/00* (2006.01)

(52) U.S. Cl.
CPC ....... *F02D 41/0072* (2013.01); *F02M 25/0786* (2013.01); *F02B 47/08* (2013.01)
USPC ........................ 701/108; 123/399; 123/568.21

(58) Field of Classification Search
CPC .. F02M 25/0786; F02D 41/0072; F02B 47/08
USPC ..................... 123/399, 568.21; 701/103, 108; 73/114.31, 114.32, 114.33, 114.37, 73/114.74
See application file for complete search history.

(56) References Cited

U.S. PATENT DOCUMENTS

| 6,115,664 | A | * | 9/2000 | Cullen et al. ................... 701/102 |
| 7,263,428 | B2 | * | 8/2007 | Kobayashi et al. ............ 701/108 |
| 7,269,497 | B2 | | 9/2007 | Schreurs et al. |
| 7,946,162 | B2 | * | 5/2011 | Vennettilli et al. ......... 73/114.73 |
| 2006/0235603 | A1 | | 10/2006 | Kobayashi et al. |

FOREIGN PATENT DOCUMENTS

| JP | 2005-009437 | | 1/2005 | |
| JP | 2008-101626 | | 5/2008 | |
| JP | 2012-92689 | * | 5/2012 | ............. F02M 25/07 |

OTHER PUBLICATIONS

Office Action (2 pages) dated Sep. 11, 2013, issued in corresponding Japanese Application No. 2010-244207 and English translation (2 pages).
U.S. Appl. No. 13/283,642, of Takezoe, filed Oct. 28, 2011.

* cited by examiner

*Primary Examiner* — Hai Huyhn
(74) *Attorney, Agent, or Firm* — Nixon & Vanderhye P.C.

(57) ABSTRACT

An apparatus estimates a quantity of recirculated exhaust gas. The apparatus includes a first unit computing a total quantity of gas, a second unit computing a quantity of exhaust gas passing through an EGR vale by means of an EGR valve model, a third unit computing a temporal quantity of the exhaust gas by means of an EGR diffusion model which simulates a behavior of the exhaust gas, a fourth unit obtaining an intake air quantity by subtracting the temporal exhaust gas quantity from the total gas quantity, a fifth unit correcting the computed intake air quantity by means of intake air quantity measured by the airflow meter, a sixth unit computing an intake air pressure based on the corrected quantity of the intake air, and a seventh unit computing a quantity of the recirculated exhaust gas based on at least the intake air pressure.

5 Claims, 3 Drawing Sheets

APPARATUS FOR ESTIMATING EXHAUST GAS RECIRCULATION QUANTITY

CROSS-REFERENCE TO RELATED APPLICATION

This application is based on Japanese Patent Application No. 2010-239129 filed on Oct. 25, 2010, the disclosure of which is incorporated herein by reference.

FIELD OF THE INVENTION

The present invention relates to an apparatus for estimating exhaust gas recirculation quantity which flows into a cylinder of an internal combustion engine.

BACKGROUND OF THE INVENTION

JP-2008-101626A shows an exhaust gas recirculation (EGR) system in which quantity of recirculation gas is controlled by an exhaust gas recirculation valve (EGR valve). In this EGR system, the quantity of exhaust gas passing through the EGR valve is computed by means of an EGR valve model which simulates a behavior of the recirculated exhaust gas passing through the EGR valve. When the engine is stably running, it is deemed that the quantity of the exhaust gas passing through the EGR valve is equal to the quantity of the exhaust gas flowing into a cylinder. When the engine is in a transitional running condition, the quantity of the exhaust gas flowing into the cylinder is computed based on the quantity of the exhaust gas passing through the EGR valve by means of a EGR diffusion model (time delay+first order lag) which simulates a behavior of the exhaust gas flowing in an intake pipe toward an intake port of the engine.

In order to improve fuel economy of the engine equipped with an EGR system, it is necessary to control the quantity of the recirculated exhaust gas flowing into a cylinder so that gas including exhaust gas is efficiently combusted in a cylinder. Thus, it is necessary to estimate the quantity recirculated exhaust gas flowing into the cylinder with high accuracy. However, in the above EGR system, an estimating accuracy of the quantity of the recirculated exhaust gas does no satisfy a required accuracy to improve a fuel economy. Especially, when the engine is in a transitional running condition, an estimation error exceeds an allowable error range.

SUMMARY OF THE INVENTION

The present invention is made in view of the above matters, and it is an object of the present invention to provide an apparatus which is able to accurately estimate exhaust gas recirculation quantity flowing into a cylinder of an internal combustion engine According to the present invention, an apparatus for estimating exhaust gas recirculation quantity includes an EGR valve controlling a quantity of an exhaust gas recirculated from an exhaust passage into an intake passage through an EGR passage, and a measuring means for measuring a quantity of an intake air flowing through the intake passage. Further, the apparatus includes:

a first means for computing a quantity of a total gas flowing into a cylinder by means of an intake valve model which simulates a behavior of gas flowing through the intake passage toward a cylinder;

a second means for computing a quantity of the exhaust gas passing through the EGR valve by means of an EGR valve model which simulates a behavior of the recirculated exhaust gas passing through the EGR valve;

a third means for computing a temporal quantity of the exhaust gas flowing into the cylinder based on the quantity of the exhaust gas passing through the EGR valve by means of an EGR diffusion model which simulates a behavior of the exhaust gas flowing through the intake passage toward an intake port of the internal combustion engine;

a fourth means for obtaining the quantity of the intake air flowing into the cylinder by subtracting the temporal quantity of the exhaust gas flowing into the cylinder from the total quantity of the gas flowing into the cylinder;

a fifth means for correcting the quantity of the intake air flowing into the cylinder by means of the intake air quantity measured by the measuring means; a sixth means for computing an intake air pressure based on the quantity of the intake air corrected by the fifth means, and a seventh means for computing a quantity of the recirculated exhaust gas flowing into the cylinder based on at least the intake air pressure.

According to the above configuration, the intake valve model computes a total quantity of gas flowing into a cylinder, and the EGR valve model and the EGR diffusion model computes a temporal quantity of the recirculated exhaust gas flowing into the cylinder. After that, the quantity of the intake air flowing into the cylinder is obtained by subtracting the temporal quantity of the exhaust gas flowing into the cylinder from the total quantity of the gas flowing into the cylinder.

Further, the computed quantity of the intake air is corrected by means of the intake air quantity measured by the measuring means. An intake air pressure is computed based on the corrected quantity of the intake air. Then, a quantity of the recirculated exhaust gas flowing into the cylinder is computed based on at least the intake air pressure. Thus, the quantity of the recirculated exhaust gas can be computed with high accuracy based on the exhaust gas quantity which the measuring means measures.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

An embodiment of the present invention, which is applied to an internal combustion engine equipped with a turbocharger, will be described hereinafter.

Figure 1:
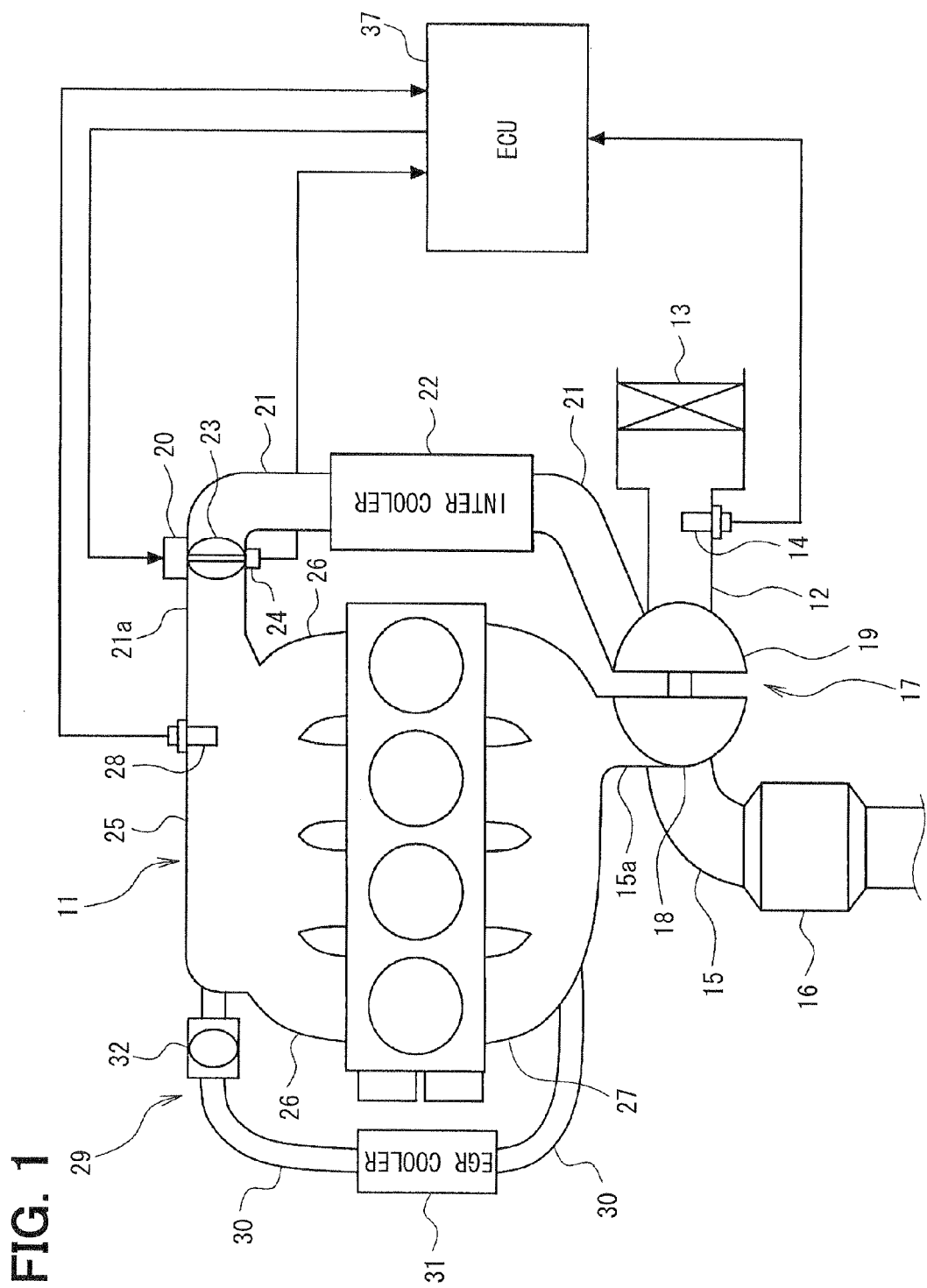
FIG. 1 is a schematic view of an engine control system with a turbocharger according to an embodiment of the present invention.
Figure 2:
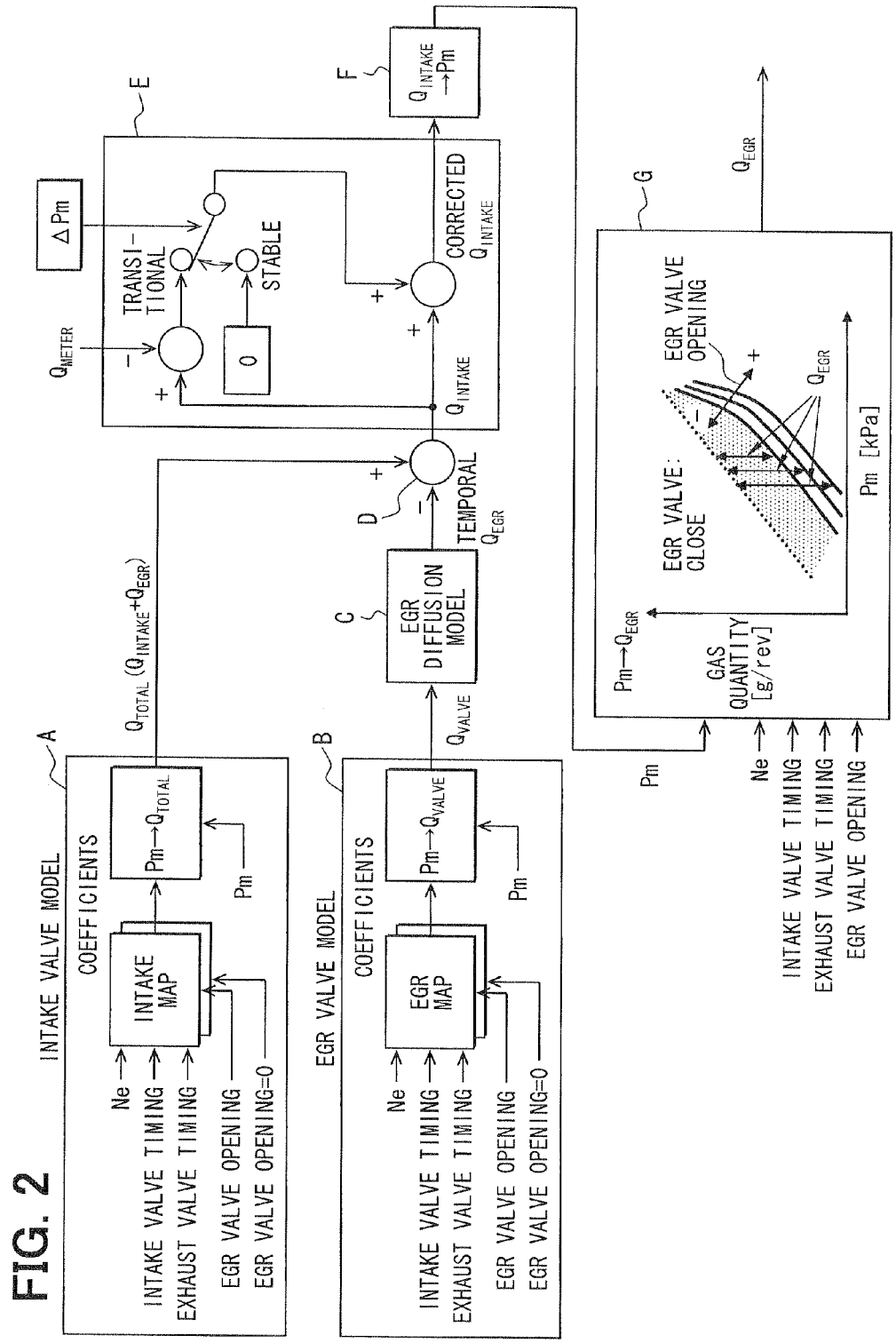
FIG. 2 is a block diagram for explaining a method for computing a quantity of recirculated exhaust gas flowing into a cylinder.

Referring to FIG. 1, an engine control system will be schematically explained. An air cleaner 13 is arranged upstream of an intake pipe 12 (intake passage) of an internal combustion engine 11. An airflow meter 14 detecting an intake air flow rate is provided downstream of the air cleaner 13. An exhaust pipe 15 (exhaust passage) of the engine 11 is provided with a three-way catalyst 16 which reduces CO, HC, NOx, and the like contained in exhaust gas.

The engine 11 is provided with the turbocharger 17. The turbocharger 17 includes an exhaust gas turbine 18 arranged upstream of the catalyst 16 in the exhaust pipe 15 and a compressor 19 arranged downstream of the airflow meter 14 in the intake pipe 12. This turbocharger 17 has well known configuration which supercharges the intake air into the combustion chamber.

An intercooler 22 cooling the intake air is provided in the intake pipe 21 downstream of the compressor 19. A throttle valve 23 driven by a DC-motor 20 and a throttle position sensor 24 detecting a throttle position are provided downstream of the intercooler 22.

A surge tank 25 is provided downstream of the throttle valve 23. An intake manifold 26 is connected to the surge tank 25 to introduce air into each cylinder of the engine 11. A fuel injector (not shown) is provided to each cylinder for performing direct injection or port injection. An intake air pressure sensor 28 detecting intake air pressure Pm is provided in the surge tank 25. A spark plug (not shown) is mounted on a cylinder head of the engine 11 corresponding to each cylinder to ignite air-fuel mixture in each cylinder.

An exhaust manifold 27 (exhaust passage) is connected to each exhaust port of the cylinder. A confluent portion of the exhaust manifold 27 is connected to the exhaust pipe 15a upstream of the exhaust gas turbine 18. Between the exhaust passage 15a, 27 upstream of the exhaust gas turbine 18 and the intake passage 21a, 25, 26 downstream of the throttle valve 23, an EGR pipe 30 of the EGR system 29 is provided in order to recirculate a part of exhaust gas into the intake passage downstream of the throttle valve 23. An EGR cooler 31 cooling the recirculated exhaust gas and an EGR valve 32 controlling the quantity of the recirculated exhaust gas flowing into the intake passage are provided in the EGR pipe 30. An opening degree of the EGR valve 32 is adjusted by a motor (not shown).

Also, the engine 11 is provided with a variable valve timing controller (not shown) which adjusts valve timings of an intake valve and an exhaust valve. A crank angle sensor (not shown) is provided on a cylinder block to output crank angle pulses when a crank shaft rotates a predetermined angle. Based on this crank angle pulses, a crank angle and an engine speed Ne are detected.

The outputs from the above sensors are inputted into an electronic control unit 37, which is referred to an ECU 37 hereinafter. The ECU 37 detects engine driving condition based on the outputs of the sensors. When the engine driving condition is a specified condition to perform an EGR control, the ECU 37 opens the EGR valve 32, whereby a part of exhaust gas is recirculated into the intake passage downstream of the throttle valve 23. At this moment, the ECU 37 executes an EGR quantity computing program, which will be described later, so that the quantity of the recirculated exhaust gas flowing into the cylinder is computed. The quantity of the recirculated exhaust gas flowing into the cylinder is denoted by "$Q_{EGR}$", hereinafter. The ECU 37 feedback-controls the opening degree of the EGR valve 32 in such a manner that the computed "$Q_{EGR}$" agrees with a target "$Q_{EGR}$". Alternatively, the ECU 37 computes an EGR ratio based on the computed "$Q_{EGR}$" and feedback-controls the opening degree of the EGR valve 32 in such a manner that the EGR ratio agrees with a target EGR ratio.

$$\text{EGR ratio} = Q_{EGR}/Q_{TOTAL} = Q_{EGR}/(Q_{INTAKE}+Q_{EGR})$$

"$Q_{TOTAL}$" represents a total gas quantity flowing into the cylinder and "$Q_{INTAKE}$" represents a quantity of intake air flowing into the cylinder.

Alternatively, based on the computed "$Q_{EGR}$", an ignition timing, intake valve timing or exhaust valve timing can be controlled.

According to the present embodiment, the quantity of the recirculated exhaust gas flowing into a cylinder is computed by means of a first to a seventh unit "A" to "G". The function of each unit will be described hereinafter.

[First Unit "A"]

A first unit "A" computes "$Q_{TOTAL}$" ($=Q_{INTAKE}+Q_{EGR}$) by means of an intake valve model which simulates a behavior of the intake air flowing into a cylinder with the recirculated exhaust gas.

The intake valve model is approximated by a following formula (1) of which input parameters are an estimated intake air pressure Pm, coefficients $A_0$, $A_1$, and $A_2$.

$$Q_{TOTAL}=A_2 \times Pm^2+A_1 \times Pm+A_0 \qquad (1)$$

The coefficients $A_0$, $A_1$, $A_2$ are computed based on an intake air characteristic map which is previously defined by simulations or experiments. The intake air characteristic map is comprised of a plurality of maps which is defined at every opening degree of the EGR valve 32. The coefficients $A_0$, $A_1$, $A_2$ are defined for every opening degree of the EGR valve 32. The estimated intake air pressure Pm is computed by means of an intake pipe model. The details of the intake pipe model are described in JP-2008-101626A.

[Second Unit "B"]

A second unit "B" computes the quantity of the exhaust gas passing through the EGR valve 32 by means of an EGR valve model which simulates a behavior of the recirculated exhaust gas passing through the EGR valve 32. The quantity of the exhaust gas passing through the EGR valve 32 is denoted by "$Q_{VALVE}$", hereinafter.

The EGR valve model is approximated by a following formula (2) of which input parameters are an estimated intake air pressure Pm, coefficients $B_0$, $B_1$, and $B_2$.

$$Q_{VALVE}=B_2 \times Pm^2+B_1 \times Pm+B_0 \qquad (2)$$

The coefficients $B_0$, $B_1$, $B_2$ are computed based on an EGR characteristic map which is previously defined by simulations or experiments. The EGR characteristic map is comprised of a plurality of maps which is defined at every opening degree of the EGR valve 32. The coefficients $B_0$, $B_1$, $B_2$ are defined for every opening degree of the EGR valve 32. The estimated intake air pressure Pm is computed by means of the above intake pipe model.

[Third Unit "C"]

A third unit "C" computes a temporal "$Q_{EGR}$" based on "$Q_{VALVE}$" by means of an EGR diffusion model which simulates a behavior of the exhaust gas flowing in an intake pipe toward an intake port of the engine. The EGR diffusion model is approximated by "time delay+first order lag".

[Fourth Unit "D"]

A fourth unit "D" subtracts the above temporal "$Q_{EGR}$" from "$Q_{TOTAL}$" computed by the first unit "A" in order to obtain "$Q_{INTAKE}$".

$$Q_{INTAKE}=Q_{TOTAL}-\text{Temporal } Q_{EGR} \qquad (3)$$

[Fifth Unit "E"]

A fifth unit "E" corrects the computed "$Q_{INTAKE}$" by means of intake air quantity measured by the airflow meter 14. Specifically, the fifth unit "E" has a switching means which switches the correction quantity "$Q_C$" of "$Q_{INTAKE}$" between for stable driving condition and for transitional driving condition. When a variation ΔPm in the estimated intake air pressure Pm per unit time is not greater than a specified value, it is determined that the engine 11 is in the stable driving condition. When the variation ΔPm is greater than the specified value, it is determined that the engine 11 is in the transitional driving condition.

When the engine is in the transitional driving condition, the correction quantity "$Q_C$" of "$Q_{INTAKE}$" is set to a differential value between the computed "$Q_{INTAKE}$" and the measured intake air quantity measured by the airflow meter 14. The measured intake air quantity is denoted by "$Q_{METER}$", hereinafter.

$$Q_C = Q_{INTAKE} - Q_{METER} \quad (4)$$

$$\text{Corrected } Q_{INTAKE} = Q_{INTAKE} + Q_C \quad (5)$$
$$= Q_{INTAKE} + (Q_{INTAKE} - Q_{METER})$$

When the engine is in the stable condition, "$Q_C$" is set to zero. Therefore, when the engine is in the stable condition, "$Q_{INTAKE}$" computed by the fourth unit "D" is used without any correction.

[Sixth Unit "F"]

A sixth unit "F" computes an estimated intake air pressure Pm based on "$Q_{INTAKE}$" corrected by the fifth unit "E", by means of an inverse model of the intake valve model which is used in the first unit "A".

[Seventh Unit "G"]

A seventh unit "G" computes "$Q_{EGR}$" based on the estimated intake air pressure Pm, an engine speed Ne, an intake valve timing, an exhaust valve timing, and the opening degree of the EGR valve 32, by means of the EGR valve model.

Figure 3:
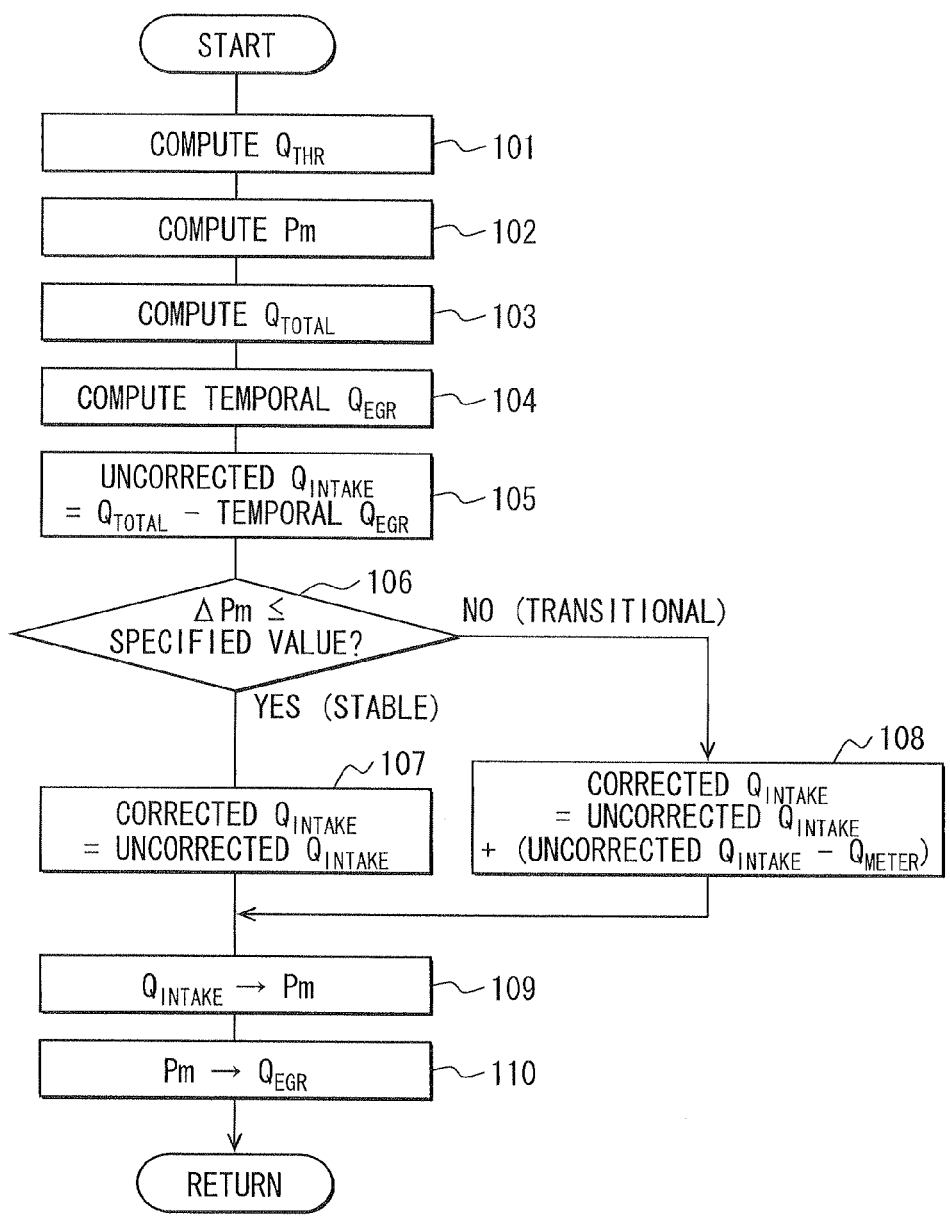
FIG. 3 is a flowchart showing a processing for computing a quantity of recirculated exhaust gas flowing into a cylinder.

The ECU 37 executes an EGR quantity computing program of which processing is shown FIG. 3, whereby the above functions of the first to the seventh unit "A" to "G" are realized. The routine shown in FIG. 3 is executed at specified time intervals while the engine is running. In step 101, the ECU 37 computes the quantity of intake air passing through the throttle valve 23, which is denoted by "$Q_{THR}$", based on the throttle opening detected by the throttle position sensor 24 by means of a throttle model which simulates the behavior of the intake air passing through the throttle valve 23. The details of the throttle model are described in JP-2008-101626A.

In step 102, the estimated intake air pressure Pm is computed by means of the intake pipe model. In step 103, "$Q_{TOTAL}$" is computed by means of the intake valve model of the first unit "A".

In step 104, the temporal "$Q_{EGR}$" is computed by means of the EGR valve model of the second unit "B" and the EGR diffusion model of the third unit "C". In step 105, "$Q_{INTAKE}$" of before correction is obtained by subtracting the temporal "$Q_{EGR}$" computed in step 104 from "$Q_{TOTAL}$" computed in step 103.

$$\text{Uncorrected } Q_{INTAKE} = Q_{TOTAL} - \text{Temporal } Q_{EGR} \quad (6)$$

Then, the procedure proceeds to step 106 in which the ECU 37 determines whether the variation ΔPm (absolute value) in the estimated intake air pressure Pm is less than or equal to the specified value. When the answer is YES in step 106, the procedure proceeds to step 107 in which "$Q_C$" is set to zero and "$Q_{INTAKE}$" of before correction is defined as the corrected "$Q_{INTAKE}$".

$$\text{Corrected } Q_{INTAKE} = \text{Uncorrected } Q_{INTAKE} \quad (7)$$

When the answer is NO in step 106, the procedure proceeds to step 108 in which "$Q_{INTAKE}$" is corrected.

$$\text{Corrected } Q_{INTAKE} = \text{Uncorrected } Q_{INTAKE} + Q_C \quad (8)$$
$$= \text{Uncorrected } Q_{INTAKE} +$$
$$(\text{Uncorrected } Q_{INTAKE} - Q_{METER})$$

Then, the procedure proceeds to step 109 in which the estimated intake air pressure Pm is computed based on the corrected "$Q_{INTAKE}$" by means of the inverse model of the intake valve model. Then, the procedure proceeds to step 110 in which "$Q_{EGR}$" is computed based on the pressure Pm, the engine speed Ne, the intake valve timing, the exhaust valve timing, and the opening degree of the EGR valve 32, by means of the EGR valve model.

According to the above embodiment, since the intake air quantity is corrected by using of the intake air quantity "$Q_{METER}$" measure by the airflow meter 14, the quantity of the recirculated exhaust gas flowing into a cylinder "$Q_{EGR}$" can be computed with high accuracy.

The present invention can be applied to an engine control system having no supercharger.

What is claimed is:

1. An apparatus for estimating a quantity of recirculated exhaust gas flowing into a cylinder of an internal combustion engine, the apparatus comprising:
   an EGR valve controlling a quantity of an exhaust gas recirculated from an exhaust passage into an intake passage through an EGR passage;
   a measuring means for measuring a quantity of an intake air flowing through the intake passage;
   a first means for computing a quantity of a total gas flowing into a cylinder by means of an intake valve model which simulates a behavior of gas flowing through the intake passage toward a cylinder;
   a second means for computing a quantity of the exhaust gas passing through the EGR valve by means of an EGR valve model which simulates a behavior of the recirculated exhaust gas passing through the EGR valve;
   a third means for computing a temporal quantity of the exhaust gas flowing into the cylinder based on the quantity of the exhaust gas passing through the EGR valve by means of an EGR diffusion model which simulates a behavior of the exhaust gas flowing through the intake passage toward an intake port of the internal combustion engine;
   a fourth means for obtaining the quantity of the intake air flowing into the cylinder by subtracting the temporal quantity of the exhaust gas flowing into the cylinder from the total quantity of the gas flowing into the cylinder;
   a fifth means for correcting the quantity of the intake air flowing into the cylinder by means of the intake air quantity measured by the measuring means;
   a sixth means for computing an intake air pressure based on the quantity of the intake air corrected by the fifth means, and
   a seventh means for computing a quantity of the recirculated exhaust gas flowing into the cylinder based on at least the intake air pressure.

2. An apparatus according to claim 1, wherein
   the fifth means switches a quantity of correction of the intake air quantity between for a stable driving condition and for a transitional driving condition.

3. An apparatus according to claim 1, wherein
the fifth means sets a quantity of correction of the intake air quantity to a differential value between the computed intake air quantity and the measured intake air quantity.

4. An apparatus according to claim 1, wherein
the sixth means computes the intake air pressure by means of an inverse model of the intake valve model.

5. An apparatus according to claim 1, wherein
the seventh means computes the quantity of the recirculated exhaust gas flowing into the cylinder based on the intake air pressure, an engine speed, and an opening degree of the EGR valve.

* * * * *